(12) United States Patent
Zhu

US012488507B2

(10) Patent No.: US 12,488,507 B2
(45) Date of Patent: Dec. 2, 2025

(54) POINT CLOUD DATA ENCODING METHOD AND DECODING METHOD, DEVICE, MEDIUM, AND PROGRAM PRODUCT

(71) Applicant: TENCENT TECHNOLOGY (SHENZHEN) COMPANY LIMITED, Shenzhen (CN)

(72) Inventor: Wenjie Zhu, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 485 days.

(21) Appl. No.: 17/974,829

(22) Filed: Oct. 27, 2022

(65) Prior Publication Data

US 2023/0051652 A1 Feb. 16, 2023

Related U.S. Application Data

(63) Continuation of application No. PCT/CN2021/131278, filed on Nov. 17, 2021.

(30) Foreign Application Priority Data

Dec. 7, 2020 (CN) .......................... 202011440832.7

(51) Int. Cl.
*H04N 13/161* (2018.01)
*G06T 9/00* (2006.01)
(Continued)

(52) U.S. Cl.
CPC .............. *G06T 9/001* (2013.01); *G06T 17/00* (2013.01); *G06V 10/761* (2022.01)

(58) Field of Classification Search
CPC ......... G06T 9/001; G06T 17/00; G06T 9/004; G06V 10/761; H04N 13/161; H04N 19/10; H04N 19/597
(Continued)

(56) References Cited

U.S. PATENT DOCUMENTS 9,530,225 B1 * 12/2016 Nieves ..................... G06T 9/001
11,297,346 B2 * 4/2022 Chou ...................... G06T 9/004
(Continued)

FOREIGN PATENT DOCUMENTS

CN 109889840 A 6/2019
CN 111052189 A 4/2020
(Continued)

OTHER PUBLICATIONS

Zhu et al., "Lossless Point Cloud Geometry Compression via Binary Tree Partition and Intra Prediction," Cooperative MediaNet Innovation Center, Shanghai Jiao Tong University, China, 2017, 6 pages.
(Continued)

*Primary Examiner* — Chineyere Wills-Burns
*Assistant Examiner* — Lucius Cameron Green Allen
(74) *Attorney, Agent, or Firm* — Crowell & Moring LLP

(57) ABSTRACT

A point cloud data encoding method and decoding method, a device, a medium, and a program product are provided, and relate to the field of point cloud application technologies. One method includes obtaining point cloud data, the point cloud data comprising at least two data points; and sequentially encoding data points in the point cloud data according to encoding orders of the data points, to obtain encoded point cloud data corresponding to the point cloud data, wherein the encoding orders of the data points being determined based on distances among the data points. Another method includes obtaining encoded point cloud data, obtaining reference information, the reference information being used for indicating a start reference data point of an encoding queue; and sequentially decoding, based on the reference information and the encoded point cloud data, data points according to the encoding orders of the data points.

20 Claims, 9 Drawing Sheets

(51) Int. Cl.
  *G06T 17/00* (2006.01)
  *G06V 10/74* (2022.01)
  *H04N 19/10* (2014.01)
  *H04N 19/597* (2014.01)

(58) Field of Classification Search
  USPC ............................................. 382/232
  See application file for complete search history.

(56) References Cited

U.S. PATENT DOCUMENTS

| | | | |
|---|---|---|---|
| 2013/0163879 A1* | 6/2013 | Katz | G06T 7/55 |
| | | | 382/195 |
| 2019/0075320 A1* | 3/2019 | Mammou | H04N 19/597 |
| 2020/0021856 A1* | 1/2020 | Tourapis | H04N 19/13 |
| 2020/0410690 A1* | 12/2020 | Zeng | G06V 20/56 |
| 2021/0004993 A1* | 1/2021 | Sugio | G06T 9/40 |
| 2022/0224940 A1* | 7/2022 | Hur | H04N 19/119 |
| 2022/0343548 A1* | 10/2022 | Park | H04N 21/4402 |

FOREIGN PATENT DOCUMENTS

| | | |
|---|---|---|
| CN | 111405281 A | 7/2020 |
| EP | 3 467 784 A1 | 10/2019 |

OTHER PUBLICATIONS

International Search Report with English translation and Written Opinion regarding PCT/CN2021/131278 dated Jan. 26, 2022, 8 pages.
Extended European Search Report regarding 21 902 355.3 dated May 10, 2024, 12 pages.
Anonymous, "G-PCC codec description v8," 131, MPEG MEETING, Jun. 29, 2020-Jul. 3, 2020, Online, (Motion Picture Expert Group or ISO/IEC JTC1/SC29/WG11), No. n19525, XP030292244, Oct. 10, 2020, pp. 1-140, Retrieved from the Internet: https://dms.mpeg.expert/doc_end_user/documents/131_OnLine/wg11/w19525.zipw19525.docx
Chinese Office Action regarding 202011440832.7 dated Mar. 2, 2023.
Wenjie Zhu et al., "Lossless point cloud geometry compression via binary tree partition and intra prediction," IEEE, Nov. 30, 2017, 6 pages.

* cited by examiner

POINT CLOUD DATA ENCODING METHOD AND DECODING METHOD, DEVICE, MEDIUM, AND PROGRAM PRODUCT

RELATED APPLICATION

This application is a continuation application of PCT Patent Application No. PCT/CN2021/131278, filed on Nov. 17, 2021, which claims priority to Chinese Patent Application No. 202011440832.7, filed on Dec. 7, 2020, both of which are incorporated herein by reference in their entireties.

FIELD OF THE TECHNOLOGY

Embodiments of this application relates to the field of point cloud application technologies, and in particular, to a point cloud data encoding method and decoding method, a device, a medium, and a program product.

BACKGROUND OF THE DISCLOSURE

With the continuous change of obtaining manner of a point cloud, the obtaining accuracy of the point cloud is getting higher and higher, and corresponding obtaining costs are gradually decreasing. Therefore, the application prospect of the point cloud in various scenes is getting wider and wider.

In the related art, point cloud data is mainly encoded based on an octree. For point cloud data in three-dimensional (3D) space, an octree-based division manner is to evenly divide a preset bounding box layer by layer, where each node has eight subnodes, and '1' and '0' are used for indicating whether each of the subnodes of the octree is occupied. During encoding based on the octree, 3D coordinate information of the point cloud data is converted into corresponding Morton code by querying a Morton sequence table, and corresponding points of each layer of the octree are obtained according to the order of each piece of Morton code.

However, for sparse point cloud data, 3D location distribution thereof is relatively scattered, that is, most of nodes in the octree are empty, resulting in higher encoding complexity and lower encoding efficiency based on the octree.

SUMMARY

Embodiments of this application provide an image processing method and apparatus and a related device for encoding and/or decoding point cloud data, which may ensure encoding/decoding accuracy of the point cloud data, reduce the encoding/decoding complexity of point cloud data, and/or improve the encoding/decoding efficiency of the point cloud data.

The present disclosure describes a method for encoding point cloud data. The method includes obtaining, by a device, point cloud data, the point cloud data comprising at least two data points. The device includes a memory storing instructions and a processor in communication with the memory. The method further includes sequentially encoding, by the device, data points in the point cloud data according to encoding orders of the data points, to obtain encoded point cloud data corresponding to the point cloud data, wherein the encoding orders of the data points being determined based on distances among the data points.

The present disclosure describes an apparatus for encoding point cloud data. The apparatus includes a memory storing instructions; and a processor in communication with the memory. When the processor executes the instructions, the processor is configured to cause the apparatus to perform: obtaining point cloud data, the point cloud data comprising at least two data points; and sequentially encoding data points in the point cloud data according to encoding orders of the data points, to obtain encoded point cloud data corresponding to the point cloud data, wherein the encoding orders of the data points being determined based on distances among the data points.

The present disclosure describes a non-transitory computer-readable storage medium, storing computer-readable instructions. The computer-readable instructions, when executed by a processor, are configured to cause the processor to perform: obtaining point cloud data, the point cloud data comprising at least two data points; and sequentially encoding data points in the point cloud data according to encoding orders of the data points, to obtain encoded point cloud data corresponding to the point cloud data, wherein the encoding orders of the data points being determined based on distances among the data points.

Another aspect of the embodiments of this application provide a point cloud data encoding method and decoding method, a device, a medium, and a program product, which can reduce the encoding complexity of point cloud data, and improve the encoding efficiency. The technical solutions are as follows:

According to an aspect of the embodiments of this application, a point cloud data encoding method is provided, and is performed by a computer device. The method includes:

obtaining a point cloud data set, the point cloud data set including at least two data points; and sequentially encoding the data points according to encoding orders of the data points, to obtain encoded point cloud data corresponding to the point cloud data set, the encoding orders of the data points being determined based on distances among the data points.

According to an aspect of the embodiments of this application, a point cloud data decoding method is provided, and is performed by a computer device. The method includes:

obtaining encoded point cloud data corresponding to a point cloud data set, the encoded point cloud data being obtained by an encoding device by sequentially encoding data points based on encoding orders of the data points in the point cloud data set; and the encoding orders of the data points being determined based on distances among the data points;

obtaining reference information, the reference information being used for indicating a start reference data point of an encoding queue; and sequentially decoding, based on the reference information and the encoded point cloud data, the data points according to the encoding orders of the data points.

According to an aspect of the embodiments of this application, a point cloud data encoding apparatus is provided, and includes:

a point cloud obtaining module, configured to obtain a point cloud data set, the point cloud data set including at least two data points; and an encoding module, configured to sequentially encode the data points according to encoding orders of the data points, to obtain encoded point cloud data corresponding to the point cloud data set, the encoding orders of the data points being determined based on distances among the data points.

In a possible implementation, the apparatus further includes:

a queue adding module, configured to sequentially add the data points in the point cloud data set to an encoding queue based on a distance between a target data point pair before the encoding module sequentially encodes the data points according to the encoding orders of the data points, to obtain the encoded point cloud data corresponding to the point cloud data set, where the target data point pair is a data point pair formed by a data point in the encoding queue and a data point in the point cloud data set; and the encoding module is configured to sequentially encode the data points according to orders of the data points in the encoding queue, to obtain the encoded point cloud data corresponding to the point cloud data set.

In a possible implementation, the distance between the data point pair includes:

a distance between location information of the two data points in the data point pair; or a distance between attribute information of the two data points in the data point pair; or a joint distance obtained through the distance between the location information of the two data points and the distance between the attribute information of the two data points in the data point pair.

In a possible implementation, the encoding module is configured to obtain, for any first data point and second data point that are adjacent in the encoding queue, a residual signal between the first data point and the second data point.

In a possible implementation, the queue adding module is configured to:

sequentially select, based on the distance between the data point in the encoding queue and the data point in the point cloud data set, data points meeting a designated condition from the point cloud data set, and add the data points to the encoding queue, where In a possible implementation, the designated condition includes:

distances between the data points and a last data point in the encoding queue being the smallest;

or a sum of distances between the data points and the data point in the encoding queue being the smallest.

In a possible implementation, the apparatus further includes:

an initial data point determining module, configured to determine an initial data point from the point cloud data set in response to the encoding queue being empty before the queue adding module sequentially adds the data points in the point cloud data set to the encoding queue based on the distance between the target data point pair; and an initial data point adding module, configured to add the initial data point to the encoding queue.

In a possible implementation, the initial data point determining module is configured to:

randomly select a data point from the point cloud data set as the initial data point;

determine the initial data point from the point cloud data set based on geometric features of the data points included in the point cloud data set;

determine the initial data point from the point cloud data set based on statistical features of the data points included in the point cloud data set; or determine the initial data point from the point cloud data set in response to a data point division manner of the point cloud data set.

In a possible implementation, the apparatus further includes:

a queue adjustment module, configured to adjust the orders of the data points in the encoding queue based on distances between adjacent data points in the encoding queue before the encoding module sequentially encodes the data points according to the orders of the data points in the encoding queue.

In a possible implementation, the queue adjustment module is configured to:

obtain a sum of a first distance and a second distance, where the first distance is a distance between an $i^{th}$ data point and an $(i+1)^{th}$ data point in the encoding queue; the second distance is a distance between a $j^{th}$ data point and a $(j+1)^{th}$ data point in the encoding queue; and i and j are integers greater than or equal to 1, and $i \neq j$;

obtain a sum of a third distance and a fourth distance, where the third distance is a distance between the $i^{th}$ data point and the $(j+1)^{th}$ data point, and the fourth distance is a distance between the $(i+1)^{th}$ data point and the $j^{th}$ data point; and exchange locations of the $(i+1)^{th}$ data point and the $(j+1)^{th}$ data point in the encoding queue in response to the sum of the first distance and the second distance being greater than the sum of the third distance and the fourth distance.

In a possible implementation, the encoding module is configured to perform, in response to meeting a sorting end condition, the operation of sequentially encoding the data points according to orders of the data points in the encoding queue, where the end condition includes:

there being no data point not added to the encoding queue in the point cloud data set;

or a sum of distances among the data points in the encoding queue reaching a designated threshold.

According to an aspect of the embodiments of this application, a point cloud data decoding apparatus is provided, and includes:

a data obtaining module, configured to obtain encoded point cloud data corresponding to a point cloud data set, the encoded point cloud data being obtained by an encoding device by sequentially encoding data points based on encoding orders of the data points in the point cloud data set; and the encoding orders of the data points being determined based on distances among the data points;

a reference information obtaining module, configured to obtain reference information, the reference information being used for indicating a start reference data point of an encoding queue; and a decoding module, configured to sequentially decode, based on the reference information and the encoded point cloud data, the data points according to the encoding orders of the data points.

In a possible implementation, the encoded point cloud data is obtained by the encoding device by sequentially adding the data points to the encoding queue based on a distance between a target data point pair and sequentially encoding the data points according to orders of the data points in the encoding queue; and the target data point pair is a data point pair formed by a data point in the encoding queue and a data point in the point cloud data set; and the decoding module is configured to sequentially decode, based on the reference information and the encoded point cloud data, the data points according to the orders of the data points in the encoding queue.

In a possible implementation, the reference information obtaining module is configured to:

obtain the default reference information;

parse stream header information of the encoded point cloud data, to obtain the reference information;

obtain the reference information based on a data point division manner of the point cloud data set; or parse layer information of the data points in the point cloud data set, to obtain the reference information.

According to an aspect of the embodiments of this application, a computer device is provided, including a processor and a memory, the memory storing at least one computer program, the at least one computer program being loaded and executed by the processor to implement the point cloud data encoding method or the point cloud data decoding method described above.

According to an aspect of the embodiments of this application, a computer-readable storage medium is provided, storing at least one computer program, the at least one computer program being loaded and executed by a processor to implement the point cloud data encoding method or the point cloud data decoding method described above.

According to still another aspect of the embodiments of this application, a computer program product or computer program is provided, including computer instructions, the computer instructions being stored in a computer-readable storage medium. A processor of a computer device reads the computer instructions from the computer-readable storage medium, and executes the computer instructions, to cause the computer device to perform the point cloud data encoding method or the point cloud data decoding method described above.

The technical solutions provided in the embodiments of this application may include the following beneficial effects:

After data points are sorted according to distances among the data points in point cloud data, an encoder side device sequentially encodes the data points according to a sorting order, so that data points that are near in the point cloud data can be sequentially encoded, and the encoding complexity can be obviously reduced while the encoding accuracy is ensured, thereby improving the encoding efficiency.

DESCRIPTION OF EMBODIMENTS

To make the objectives, technical solutions, and advantages of this application clearer, implementations of this application are further described below in detail with reference to the accompanying drawings.

Before the embodiments of this application are described, some terms involved in the embodiments of this application are introduced first.

I. Point Cloud

The point cloud is a set of discrete points that are randomly distributed in space and express a spatial structure and a surface attribute of a three-dimensional object or scene. Each point in the point cloud has at least three-dimensional location information, and may also have color, material, or other information according to different application scenes. Generally, each point in the point cloud has a same quantity of additional attributes.

Each point in point cloud data may be referred to as a data point.

The point cloud may flexibly and conveniently express the spatial structure and the surface attribute of the three-dimensional object or scene, thereby being applied widely. Main application scenes thereof may be divided into two types:

a) point cloud perceived by a machine, such as an autonomous navigation system, a real-time inspection system, a geographic information system, a visual sorting robot, and an emergency rescue robot; and b) point cloud perceived by human eyes, point cloud application scenes such as digital cultural heritage, free-view broadcasting, three-dimensional immersive communication, and three-dimensional immersive interaction.

Obtaining ways of point clouds include, but are not limited to, computer generation, 3D laser scanning, 3D photogrammetry, and the like. A computer can generate point clouds of a virtual three-dimensional object and scene. The 3D scanning can obtain point clouds of a static real-world 3D object or scene, and can obtain a million level of point clouds per second. The 3D photography can obtain point clouds of a dynamic real-world 3D object or scene, and can obtain a ten-million level of point clouds per second. In addition, in the medical field, point clouds of a biological tissue and organ can be obtained through magnetic resonance imaging (MRI), computed tomography (CT), and electromagnetic positioning information. These technologies reduce obtaining costs and time period of point cloud data, and improve the accuracy of the data. The change of the obtaining manner of the point cloud data makes it possible to obtain a large quantity of point cloud data. With the continuous accumulation of large-scale point cloud data, efficient storage, transmission, publishing, sharing and standardization of the point cloud data have become the key to point cloud applications.

For the obtaining manner of the data, the point cloud data may be divided into a dense point cloud and a sparse point cloud. For a timing type of the data, the point cloud data may be divided into a static point cloud and a dynamic point cloud.

Figure 1:
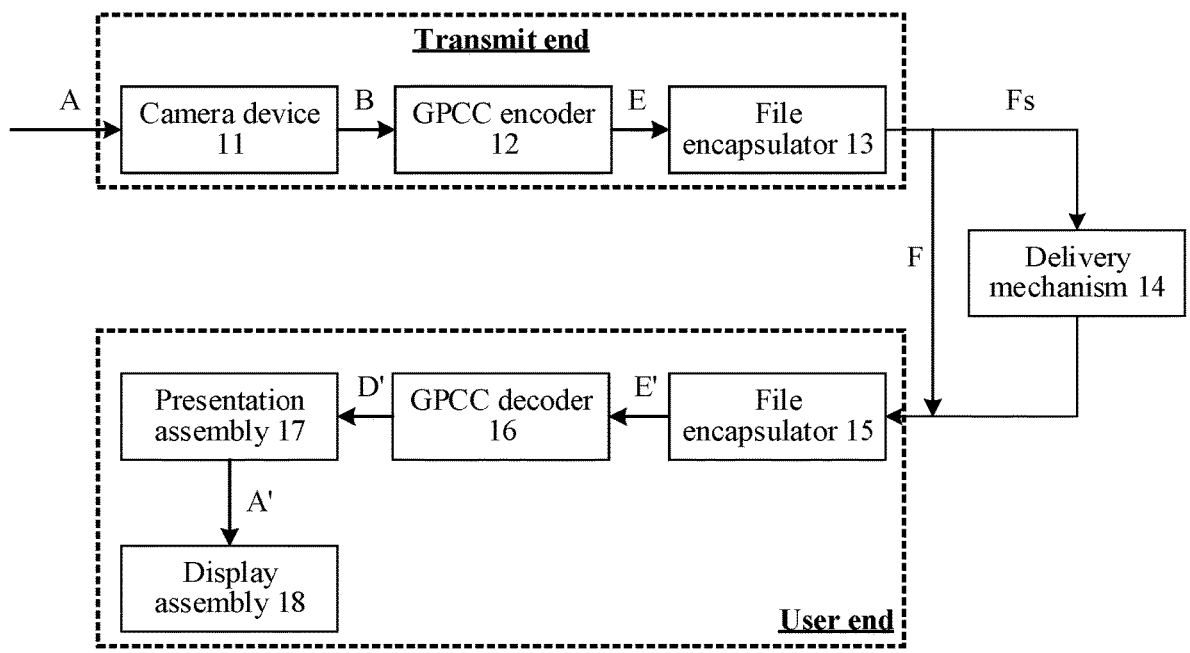
FIG. 1 is an exemplary block diagram of a point cloud application according to this application.

FIG. 1 is a block diagram of a point cloud application according to an embodiment of this application. By using G-PCC data as an example, in FIG. 1, on a transmit end, a real-world virtual scene (A) is captured by a set of cameras or a camera device 11 with a plurality of lenses and sensors. An acquisition result is source point cloud data (B). One or more point cloud frames are encoded by a G-PCC encoder 12 into encoded G-PCC bitstreams (E), which include encoded geometric bitstream and attribute bitstream. Then, a file encapsulator 13 encapsulates, according to a specified media container file format, the one or more encoded bitstreams (E) into a media file (F) for file playback, or into a sequence (Fs) of an initialization segment and a media segment for streaming transmission.

The file encapsulator 13 also includes metadata into the file or the segments, and (Fs) is delivered to a user end through a delivery mechanism 14. (Fs) is decapsulated by a file encapsulator 15 on a user side to obtain one or more encoded bitstreams (E') after decapsulation, then (E') are decoded by a G-PCC decoder 16 to obtain one or more decoded point cloud frames (D'), and a virtual scene (A') corresponding to the one or more point cloud frames (D') is presented by a presentation assembly 17 on a display assembly 18.

II. Traveling Salesman Problem (TSP)

The TSP is a classic combinatorial optimization problem. A classic TSP may be described as that: a salesman is going to sell goods in several cities, and the salesman starts from a city, and needs to return to the departure place after going through all the cities. How should a travel route be chosen to minimize the total trip? From a point of view of a graph theory, the essence of the problem is to find a loop with a smallest weight in a weighted and completely undirected graph. Because a feasible solution of this problem is full arrangement of all vertexes, and combinatorial explosion occurs as a quantity of vertexes increases, this problem is a non-deterministic polynomial (NP) complete problem. Because this problem is widely applied in the fields such as transportation, circuit board circuit design, and logistics and distribution, scholars at home and abroad have conducted a lot of research on this problem. Early researchers used exact algorithms to solve this problem, and commonly used methods include: a branch and bound method, a linear programming method, a dynamic programming method, and the like. However, as the scale of the problem increases, the exact algorithms become powerless. Therefore, in subsequent research, the scholars at home and abroad focus on using approximate algorithms or heuristic algorithms, including a genetic algorithm, a simulated annealing algorithm, an ant colony algorithm, a Tabu search algorithm, a greedy algorithm, a neural network, and the like.

For example, if the TSP is modeled through an undirected and weighted graph, a city is a vertex of the graph, a road is an edge of the graph, and a distance of the road is a length of the edge. The TSP is a minimization problem that a start point and an end point are at a specified vertex and each vertex is exactly visited once. Generally, the model is a complete graph (that is, each pair of vertexes are connected by an edge). If there is no path between two cities, a very long edge is added to complete the graph without affecting computation of an optimal loop.

In a symmetric TSP, distances back and forth between two cities are equal, thereby forming an undirected graph. The symmetry cuts the quantity of solutions in half. In an asymmetric TSP problem, there may not be all bidirectional paths, or distances back and forth may be different, thereby forming a directed graph. Traffic accidents, one-way streets, and different airfare prices of start cities and cities of arrival are examples of breaking the symmetry.

Figure 2:
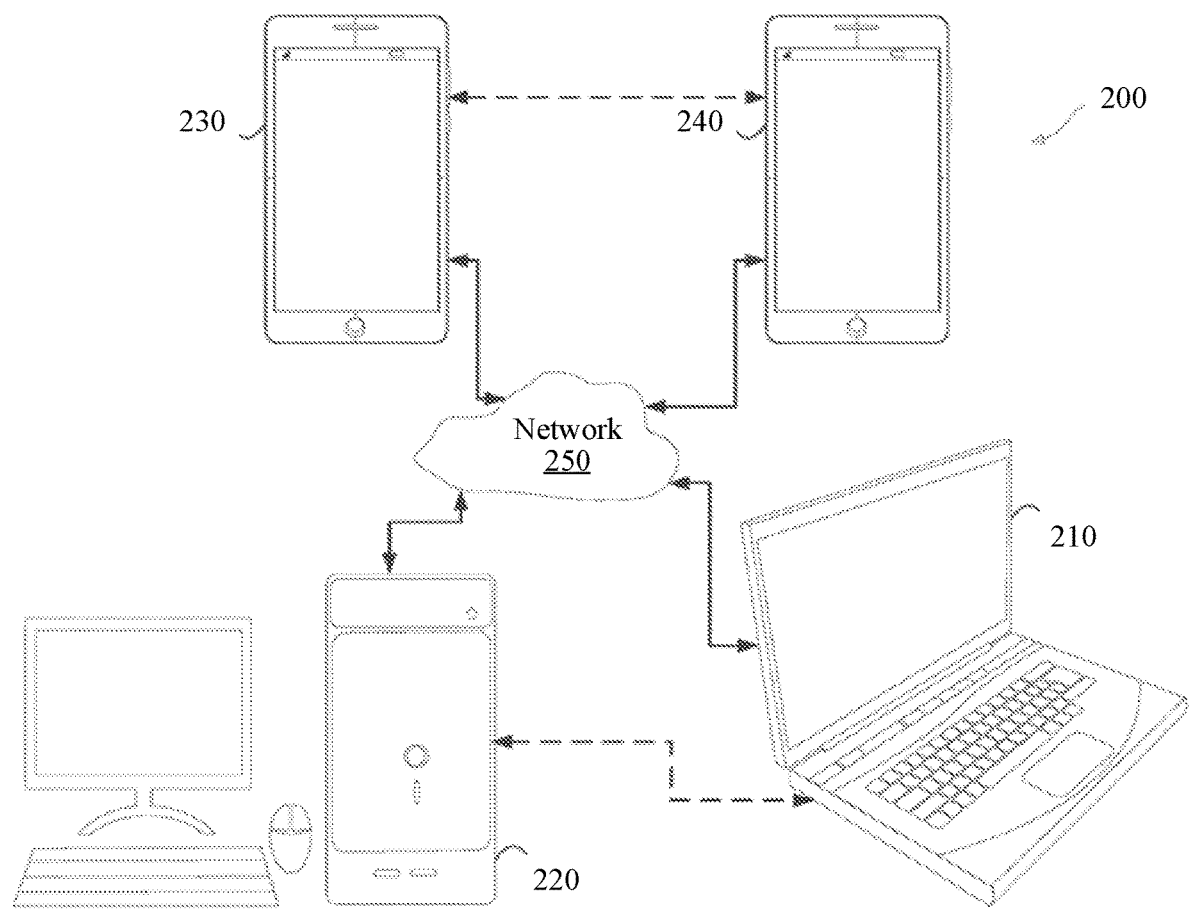
FIG. 2 is a simplified block diagram of a communication system according to an embodiment of this application.

FIG. 2 is a simplified block diagram of a communication system according to an embodiment of this application. A communication system 200 includes a plurality of devices, the devices may communicate with each other through, such as, a network 250. For example, the communication system 200 includes a first device 210 and a second device 220 that communicate with each other through the network 250. In the embodiment of FIG. 2, the first device 210 and the second device 220 perform unidirectional data transmission. For example, the first device 210 may encode point cloud data such as a stream of point cloud frames acquired by the first device 210, to transmit to the second device 220 through the network 250. The encoded point cloud data is transmitted in the form of one or more encoded point cloud bitstreams. The second device 220 may receive the encoded point cloud data from the network 250, decode the encoded point cloud data to restore the point cloud data, and represent the point cloud according to the restored point cloud data. The unidirectional data transmission is common in applications such as media services.

In another embodiment, the communication system 200 includes a third device 230 and a fourth device 240 that perform bidirectional transmission of the encoded point cloud data. For the bidirectional data transmission, each of the third device 230 and the fourth device 240 may encode the point cloud data, to transmit to the other of the third device 230 and the fourth device 240 through the network 250. Each of the third device 230 and the fourth device 240 may receive the encoded point cloud data transmitted by the other of the third device 230 and the fourth device 240, may decode the encoded point cloud data to restore the point cloud data, and may display the point cloud on an accessible display apparatus according to the restored point cloud data.

In the embodiment of FIG. 2, the first device 210, the second device 220, the third device 230, and the fourth device 240 may be computer devices such as servers, personal computers, and smart phones, but the principles disclosed in this application may not be limited thereto. This embodiment of this application is applicable to a personal computer (PC), a mobile phone, a tablet computer, a virtual reality/augmented reality device, a media player, and/or a dedicated video conference device. The network 250 represents any number of networks that transmit the encoded point cloud data among the first device 210, the second device 220, the third device 230, and the fourth device 240, and includes, for example, a wired and/or wireless communication network. The communication network 250 may exchange data in circuit-switched and/or packet-switched channels. The network may include a telecommunication network, a local area network, a wide area network, and/or the Internet. For the purpose of this application, unless explained below, the architecture and topology of the network 250 may be immaterial to the operations disclosed in this application.

Figure 3:
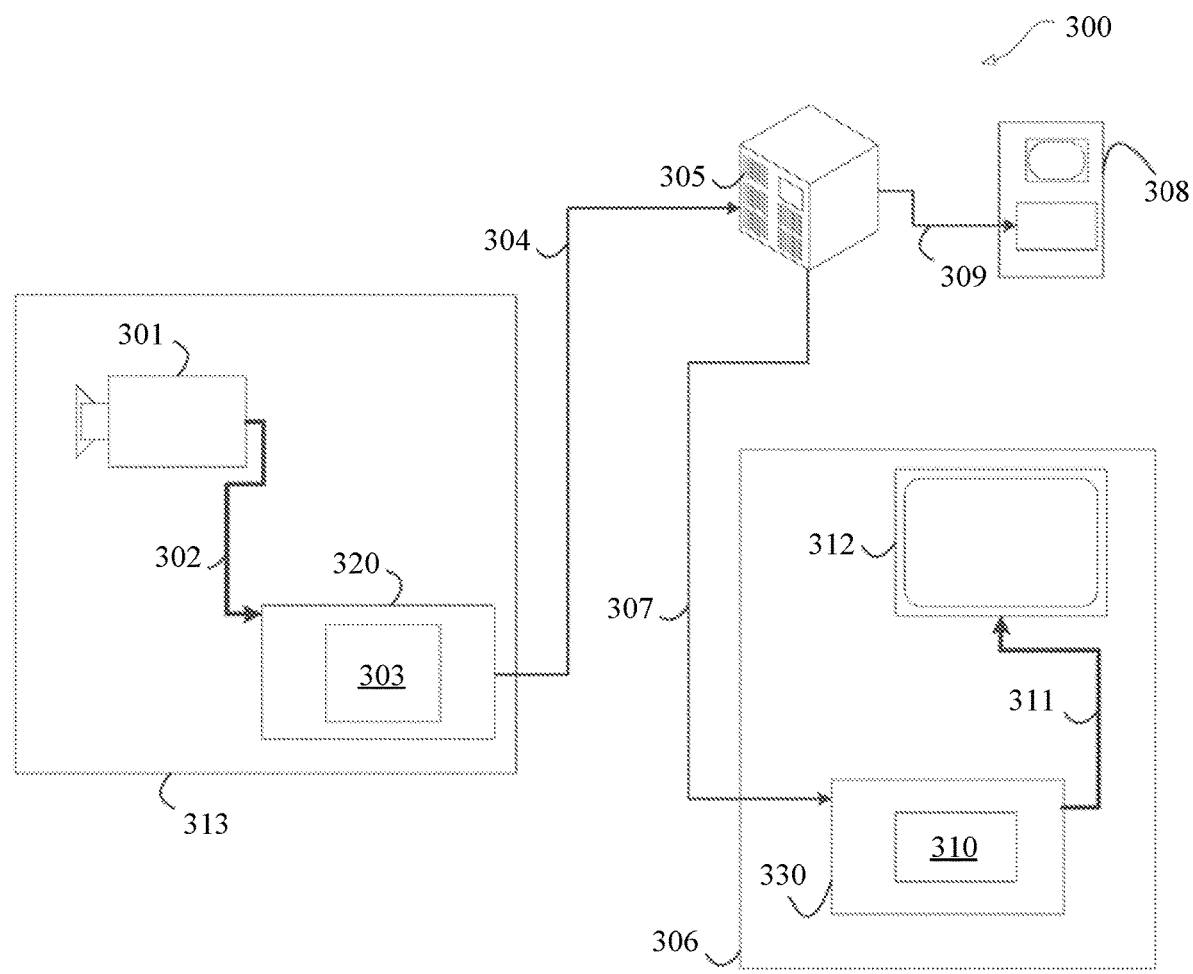
FIG. 3 is a schematic exemplary diagram of placement manners of a point cloud encoder and a point cloud decoder in a streaming transmission environment according to this application.

As an embodiment, FIG. 3 shows placement manners of a point cloud encoder and a point cloud decoder in a streaming transmission environment. The subject disclosed in this application is equally applicable to other point cloud-supported applications, including: storing compressed point clouds on digital media such as a virtual 3D conference, digital TV (television), compact disc (CD), a digital versatile disc (DVD), and a memory stick.

A streaming transmission system may include an acquisition subsystem 313, the acquisition subsystem may include a point cloud source 301 such as a three-dimensional camera, and the video source creates an uncompressed point cloud data stream 302. Compared with encoded point cloud data 304 (or an encoded point cloud bitstream), the point cloud data stream 302 is depicted as a thick line to emphasize a high data volume of the point cloud data stream. The point cloud data stream 302 may be processed by an electronic apparatus 320, where the electronic apparatus 320 includes a point cloud encoder 303 coupled to the point cloud source 301. The point cloud encoder 303 may include hardware, software, or a combination of hardware and software to implement or perform various aspects of the disclosed subject described in greater detail below. Compared with the point cloud data stream 302, the encoded point cloud data 304 (or the encoded point cloud bitstream 304) is depicted as a thin line to emphasize a lower data volume of the encoded point cloud data 304 (or the encoded point cloud bitstream 304), which may be stored on a streaming transmission server 305 for future use. One or more streaming transmission client subsystems, such as a client subsystem 306 and a client subsystem 308 in FIG. 3, may access the streaming transmission server 305 to retrieve a copy 307 and a copy 309 of the encoded point cloud data 304. The client subsystem 306 may include, such as, a point cloud decoder 310 in an electronic apparatus 330. The point cloud decoder 310 decodes the incoming copy 307 of the encoded point cloud data and produces an output point cloud data stream 311 that can be represented on a display 312 (such as, a display screen) or another representation apparatus (not depicted). In some streaming transmission systems, the encoded point cloud data 304, point cloud data 307, and point cloud data 309 (such as, point cloud bitstreams) may be encoded according to some point cloud encoding/compression standards.

The electronic apparatus 320 and the electronic apparatus 330 may include other assemblies (not shown). For example, the electronic apparatus 320 may include a point cloud decoder (not shown), and the electronic apparatus 330 may also include a point cloud encoder (not shown). The point cloud decoder is configured to decode received encoded point cloud data. The point cloud encoder is configured to encode point cloud data.

The technical solution provided in this embodiment of this application may be applied to an audio video encoding standard (AVS) such as AVS3, a next-generation video codec standard, or another standard supporting point cloud encoding. This is not limited in the embodiments of this application.

The encoding manners of point clouds may be divided into conventional video-based point cloud compression (V-PCC) and geometry-based point cloud compression (G-PCC).

For different point cloud data types, the current point cloud encoding technology may be divided into geometric structure-based point cloud encoding and projection-based point cloud encoding. Geometric structure-based point cloud encoding (G-PCC) in the international video and audio codec standard (e.g., Moving Picture Expert Group, MPEG) and a point cloud encoding standard in China national digital video and audio codec standard (e.g., Audio Video Coding Standard-PCC, AVS-PCC) are used as examples to introduce.

Figure 4:
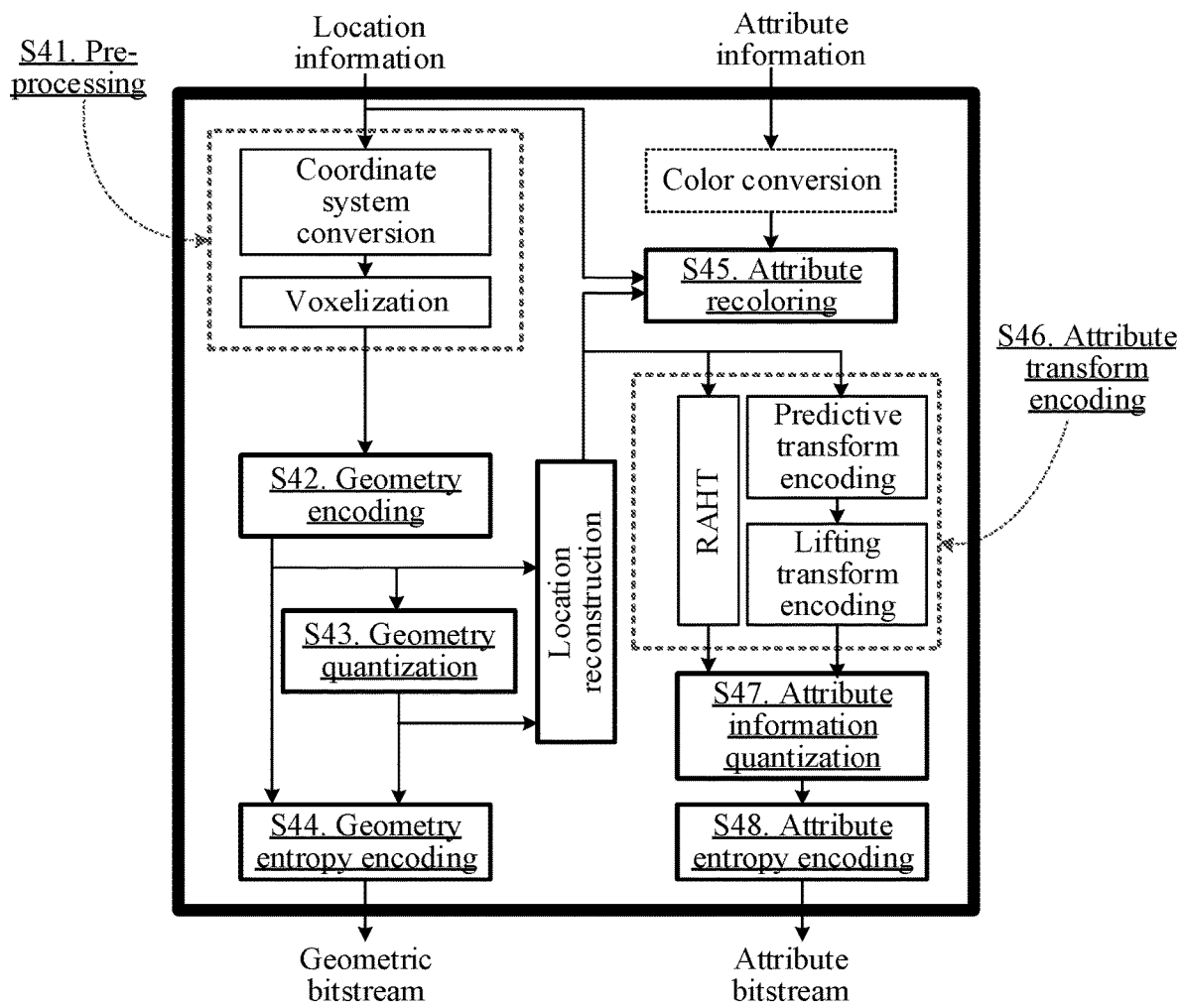
FIG. 4 is a schematic diagram of an encoding framework according to an embodiment of this application.

Both G-PCC and AVS-PCC are aimed at static sparse point clouds, and encoding frameworks thereof are roughly the same. FIG. 4 is a schematic diagram of an encoding framework according to an embodiment of this application. As shown in FIG. 4, the point cloud encoding is divided into geometric structure encoding and attribute information encoding. For the geometric structure encoding, main operations and processing are as follows:

S41. Pre-processing: including coordinate transforming and voxelization.

That is, through zooming and translating operations, point cloud data in 3D space is converted into an integer form, and a minimum geometric location thereof is moved to a coordinate origin.

S42. Geometry encoding: which may include a plurality of modes that can be used in different conditions. For example, the geometry encoding may be divided into octree-based geometry encoding, trisoup-based geometry encoding, and the like.

S43. Geometry quantization: fineness of quantization is usually determined by a quantization parameter (QP). A larger QP value indicates that coefficients with larger value ranges are quantized into a same output, usually resulting in greater distortion and a lower bit rate. Conversely, a smaller QP value indicates that coefficients with smaller value ranges are quantized into a same output, usually resulting in less distortion and corresponding to a higher bit rate. In the point cloud encoding, quantization is directly performed on coordinate information of points.

S44. Geometry entropy encoding: by using the octree-based geometry encoding based on an octree as an example, performing statistical compression encoding for occupancy code information of an octree, and finally outputting a binarized (0 or 1) compressed code stream. The statistical encoding is a lossless encoding manner that can effectively reduce a code rate required to express a same signal. A commonly used statistical encoding manner is content adaptive binary arithmetic encoding (CABAC).

For the attribute information encoding, main operations and processing are as follows:

S45. Attribute recoloring: in a case of lossy encoding, after geometric information is encoded, an encoder side needs to decode and reconstruct the geometric information, that is, to restore coordinate information of points in a 3D point cloud. Attribute information corresponding to one or more adjacent points in an original point cloud is found as attribute information of a reconstructed point.

S46. Attribute transform encoding: which may include three modes that can be used in different conditions.

Predictive transform encoding: selecting a subpoint set according to distances, and dividing a point cloud into a plurality of different levels of detail (LoD), thereby realizing representation of the point cloud from rough to fine. Bottom-up prediction may be implemented between adjacent layers, that is, attribute information of a point introduced in a fine layer is predicted through an adjacent point in a rough layer, to obtain a corresponding residual signal. A bottommost point is encoded as reference information.

Lifting transform encoding: based on prediction of LoD adjacent layers, a weight update policy of an adjacent-domain point is introduced, and finally predicted an attribute value of each point is obtained, to obtain a corresponding residual signal.

Region adaptive hierarchical transform (RAHT) encoding: the attribute information passes through RAHT, and the signal is converted into a transform domain, which is referred to as a transform coefficient.

S47. Attribute information quantization: fineness of quantization is usually determined by a QP. In the predictive transform encoding and the lifting transform encoding, entropy encoding is performed after a residual value is quantized. In RAHT, entropy encoding is performed after the transform coefficient is quantized.

S48. Attribute entropy encoding: generally, a quantized attribute residual signal or transform coefficient is finally compressed by run length encoding and arithmetic encoding. Corresponding information such as encoding modes and QPs is also encoded by an entropy encoder.

In point cloud data, one data point may be regarded as a city in a TSP, and a distance between two data points is equivalent to a distance between two cities. In the solution shown later in this application, with reference to the solution to the TSP, when point cloud data is encoded, a distance between data points in the point cloud data in pairs is considered to determine encoding orders of the data points, and the data points are sequentially encoded according to the determined encoding orders, so as to ensure the encoding accuracy, and improve the encoding efficiency of the point cloud data.

Figure 5:
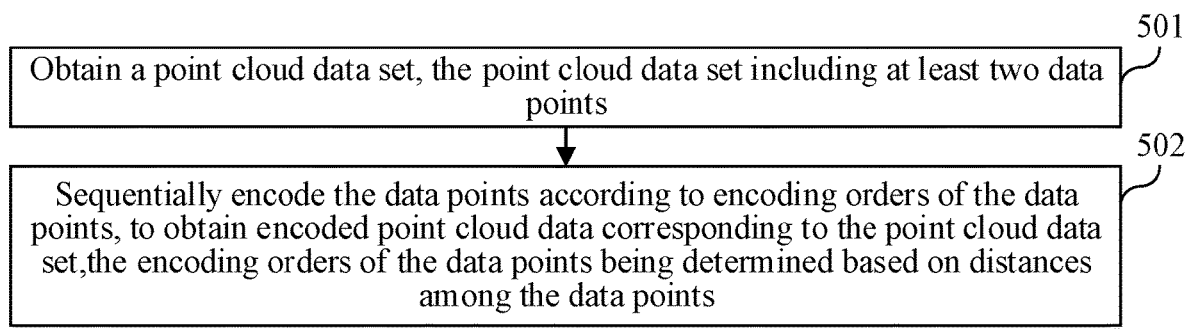
FIG. 5 is a flowchart of a point cloud data encoding method according to an embodiment of this application.

FIG. 5 is a flowchart of a point cloud data encoding method according to an embodiment of this application. As shown in FIG. 5, in an encoding stage, a computer device (an encoder side device) may perform the following steps.

Step 501. Obtain a point cloud data set, the point cloud data set including at least two data points.

In various implementations, a point cloud data may be referred to a point cloud data set.

Step 502. Sequentially encode the data points according to encoding orders of the data points, to obtain encoded point cloud data corresponding to the point cloud data, the encoding orders of the data points being determined based on distances among the data points.

Figure 6:
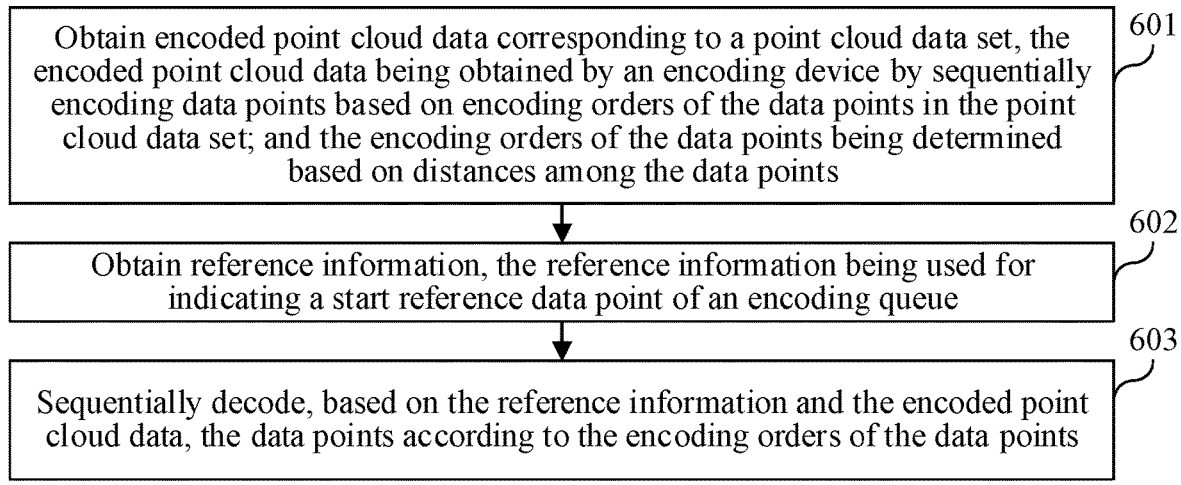
FIG. 6 is a flowchart of a point cloud data decoding method according to an embodiment of this application.

Correspondingly, FIG. 6 is a flowchart of a point cloud data decoding method according to an embodiment of this application. As shown in FIG. 6, in a decoding stage, a computer device (a decoder side device) performs the following steps.

Step 601. Obtain encoded point cloud data corresponding to a point cloud data, the encoded point cloud data being obtained by an encoding device by sequentially encoding data points based on encoding orders of the data points in the point cloud data; and the encoding orders of the data points being determined based on distances among the data points.

Step 602. Obtain reference information, the reference information being used for indicating a start reference data point of an encoding queue.

Step 603. Sequentially decode, based on the reference information and the encoded point cloud data, the data points according to the encoding orders of the data points.

In the solutions shown in the embodiments of this application, a point cloud data encoding and decoding solution performed based on orders of data points is provided.

In a possible implementation, in the point cloud data encoding solution, an encoder side device obtains a point cloud data, the point cloud data including at least two data points; and sequentially adds the data points in the point cloud data to an encoding queue based on a distance between a target data point pair; and sequentially encodes the data points according to orders of the data points in the encoding queue, to obtain the encoded point cloud data corresponding to the point cloud data.

The target data point pair is a data point pair formed by a data point in the encoding queue and a data point in the point cloud data. That is, each time one data point is added to the encoding queue, the encoding queue and the target data point pair are updated correspondingly.

In various implementations, a data point pair may be referred to a target data point pair.

The data point pair may include some of point pairs formed by all data points of the point cloud data in pairs, and may also include all the point pairs formed by all the data points of the point cloud data in pairs.

In a possible implementation, the distance between the data point pair includes:

a distance between location information of the two data points in the data point
pair; or a distance between attribute information of the two data points in the data point
pair; or
a joint distance obtained through the distance between the location information of the two data points and the distance between the attribute information of the two data points in the data point pair.

Correspondingly, in the point cloud decoding solution, a decoder side device obtains encoded point cloud data corresponding to a point cloud data; obtains reference information, the reference information being used for indicating a start reference data point of an encoding queue; and sequentially decodes, based on the reference information and the encoded point cloud data, the data points according to the orders of the data points in the encoding queue.

Through the above solutions, after data points are sorted according to distances among the data points in point cloud data (such as, according to distances between the data points in the point cloud data and a data point in an encoding queue), an encoder side device sequentially encodes the data points according to a sorting order, so that data points that are near in the point cloud data can be sequentially encoded, and the encoding accuracy is ensured. Compared with the octree-based encoding manner in the related art, the solutions shown in this application can obviously reduce the encoding complexity and improve the encoding efficiency.

The method provided in this application is applicable to encoding/decoding sections of point cloud data.

Figure 7:
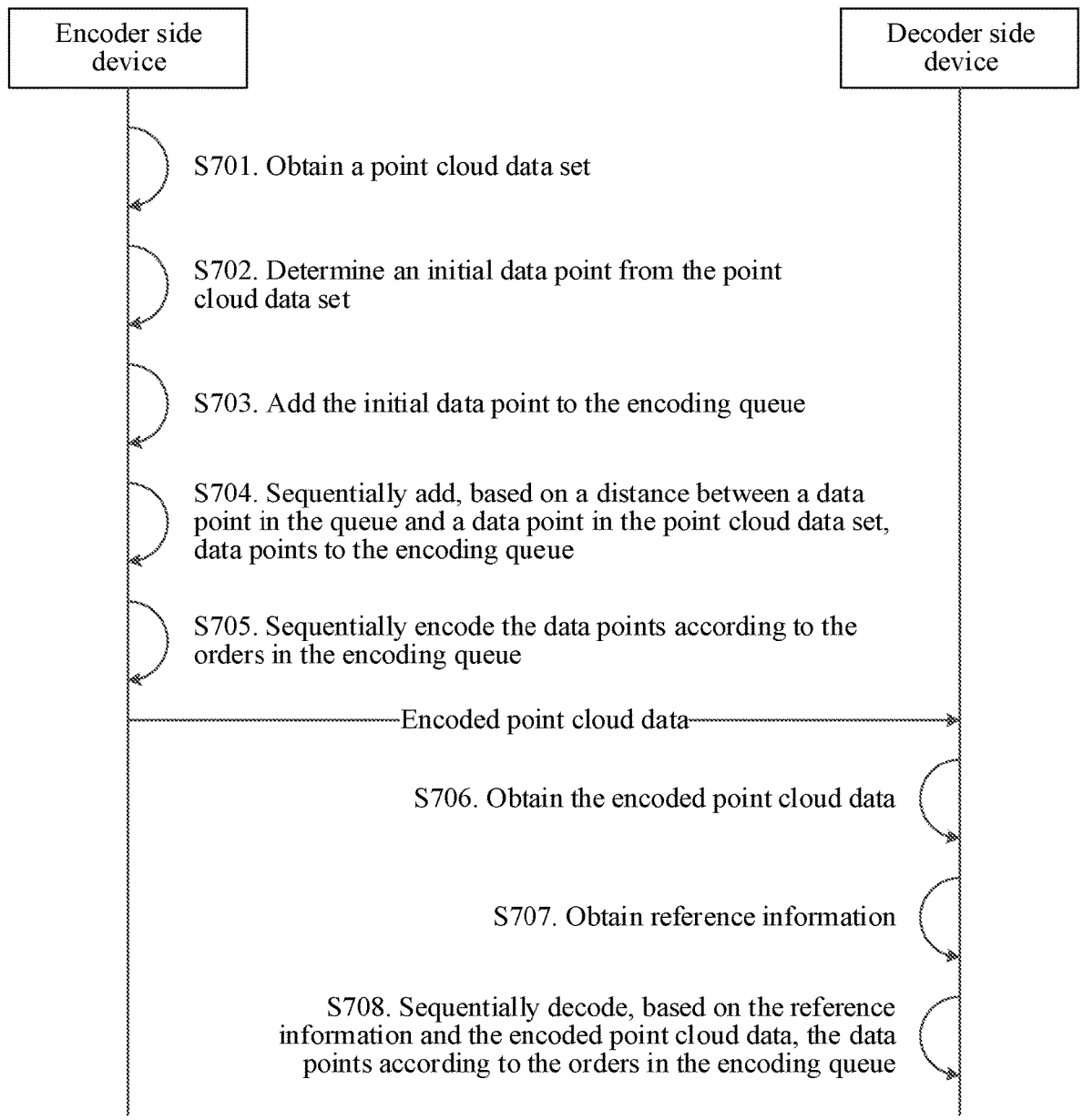
FIG. 7 is a flowchart of a point cloud data encoding and decoding method according to an embodiment of this application.

FIG. 7 is a flowchart of a point cloud data encoding and decoding method according to an embodiment of this application. For ease of description, the description is provided by merely using a computer device as the execution body of the steps. The computer device may include an encoder side device and a decoder side device. The method may include the following steps.

Step 701. The encoder side device obtains a point cloud data, the point cloud data including at least two data points.

The solution shown in this embodiment of this application may be used as an option of point cloud signal prediction, and may be configured to act on overall original point cloud data, or act on a point cloud data (such as, a subset of the overall original point cloud data) obtained through subnodes of an octree or other manners.

Step 702. The encoder side device determines an initial data point from the point cloud data in response to the encoding queue being empty.

In this embodiment of this application, in a process of encoding, the encoder side device first creates an empty encoding queue, and selects an encoded start data point from the point cloud data, where the start data point may be a data point or may include a plurality of data points.

In a possible implementation, the determining an initial data point from the point cloud data may include the following manners.

1) Randomly select a data point from the point cloud data as the initial data point.

In this embodiment of this application, the encoder side device may randomly select a data point from the point cloud data as the initial data point.

2) Determine the initial data point from the point cloud data based on geometric features of the data points included in the point cloud data.

For example, the encoder side device may use, in the point cloud data, a data point in a designated range and whose normal vector has a maximum difference as the initial data point.

3) Determine the initial data point from the point cloud data based on statistical features of the data points included in the point cloud data.

For example, the encoder side device may determine, in the point cloud data, a data point located at a center of gravity of a point cloud formed by the point cloud data in 3D space as the initial data point.

4) Determine the initial data point from the point cloud data in response to a data point division manner of the point cloud data.

For example, the encoder side device performs division according to an octree in response to the data points in the point cloud data, and determines a parent node of the octree as the initial data point.

In another example, the encoder side device performs division according to an octree in response to the data points in the point cloud data, and determines, in subnodes of the octree, a subnode including a minimum quantity of data points as the initial data point.

Step 703. The encoder side device adds the initial data point to the encoding queue.

In this embodiment of this application, the encoder side device may use the determined initial data point as a foremost data point in the encoding queue, and add the data point to the encoding queue.

After the encoding queue to which the initial data point is added is obtained, the encoder side device may start to sequentially add the data points in the point cloud data to the encoding queue based on a distance between a data point pair. The queue adding process may refer to the subsequent steps.

Step 704. The encoder side device sequentially selects, based on a distance between a data point in the encoding queue and a data point in the point cloud data, data points meeting a designated condition from the point cloud data, and adds the data points to the encoding queue.

In this embodiment of this application, before starting to sequentially add the data points in the point cloud data to the encoding queue based on the distance between the data point pair, the encoder side device may first obtain distances among data point pairs in the point cloud data (all or some of point pairs formed by the data points in the point cloud data in pairs), so as to facilitate subsequent use in the encoding queue adding process.

In this embodiment of this application, a distance between two data points in a data point pair may be represented by a distance between locations. That is, the distance between the two data points is a distance between coordinate locations of the two data points.

Alternatively, the distance between the two data points may be represented by a distance between attributes. That is, the distance between the two data points may be a distance (or referred to as an attribute difference, which can be intuitively represented as a difference value of a color value or another attribute) between attributes of the two data points.

Alternatively, the distance between two data points may be jointly represented by the distance between the locations and the distance between the attributes. For example, the distance between two data points may be an average value or a weighted average value of a Euclidean distance between the locations of the two data points and a Euclidean distance between the attributes of the two data points.

In a possible implementation, the designated condition includes:

distances between the data points and a last data point in the encoding queue being the smallest;

or a sum of distances between the data points and the data point in the encoding queue being the smallest.

In this embodiment of this application, when adding the data points to the encoding queue, the encoder side device preferentially adds other data points closest to the last data point in the encoding queue to the encoding queue, or preferentially adds other data points closest to a point cluster formed by the data points in the encoding queue to the encoding queue, so as to ensure the subsequent encoding accuracy.

In a possible implementation, the method further includes:

deleting the data points meeting the designated condition from the point cloud data.

In this embodiment of this application, the adding step of the encoding queue is also referred to as planning of an encoding path, and the planning solution of the encoding path may be as follows.

1) Establish distance measures of point cloud data points by using various commonly used geometric measure methods, such as Euclidean distances. Connections may be established between all points in pairs, that is, a complete graph is established. Alternatively, connections may be established between some of the points in pairs, that is, there is no connection relationship between some points. Alternatively, connections may be established by selecting points one by one according to a start point.

2) Set an original point set as U (corresponding to the point cloud data), and set a sorted point set as V (corresponding to the encoding queue). Assuming that there is only a single start data point $x_1$, a data point $x_{i+1}$ in next order is selected one by one to be added to V according to a point selection rule.

Optionally, after the data point $x_{i+1}$ is added to V, $x_{i+1}$ may also be removed from U. In this case, each data point is calculated once in a process of constructing the encoding queue. On the contrary, if $x_{i+1}$ is not removed from U, each data point may be calculated for a plurality of times. The point selection rule includes, but is not limited to, the following two types:

A distance between $x_{i+1}$ and $x_i$ is smallest, that is, the distance between $x_{i+1}$ and $x_i$ is a minimum value of distances between the data points and U in $x_i$. Alternatively, a sum of distances between $x_{i+1}$ and all points of V is smallest, that is, the sum of the distances between $x_{i+1}$ and all the points of V is a minimum value of sums of distances between the data points of U and all the points of V.

In a possible implementation, before the sequentially encoding the data points according to orders of the data points in the encoding queue, the method further includes:

adjusting the orders of the data points in the encoding queue based on distances between adjacent data points in the encoding queue.

In a process of sequentially adding the data points to the encoding queue, the distances between adjacent data points may not be guaranteed to be the smallest. Therefore, in this embodiment of this application, in the process of adding the data points to the encoding queue, or after adding the data points to the encoding queue, an encoding device may further optimize and adjust the orders of the data points in the encoding queue, so as to improve the subsequent encoding accuracy.

In a possible implementation, the adjusting the orders of the data points in the encoding queue based on distances between adjacent data points in the encoding queue includes:

obtaining a sum of a first distance and a second distance, where the first distance is a distance between an $i^{th}$ data point and an $(i+1)^{th}$ data point in the encoding queue; the second distance is a distance between a $i^{th}$ data point and a $(j+1)^{th}$ data point in the encoding queue; and i and j are integers greater than or equal to 1, and i≠j;

obtaining a sum of a third distance and a fourth distance, where the third distance is a distance between the $i^{th}$ data point and the $(j+1)^{th}$ data point, and the fourth distance is a distance between the $(i+1)^{th}$ data point and the $j^{th}$ data point; and exchanging locations of the $(i+1)^{th}$ data point and the $(j+1)^{th}$ data point in the encoding queue in response to the sum of the first distance and the second distance being greater than the sum of the third distance and the fourth distance.

The optimization and adjustment method may be as follows. Perform sorting exchange on point pairs in a sorted point set V, for example, for a sorted point pair $x_i$, $x_{i+1}$ and $x_j$, $x_{j+1}$, i≠j, and a sum of distances of the two pairs of points is $d_1$. Calculate a sum of distances of $x_i$, $x_{j+1}$ and $x_1$, $x_{i+1}$ as $d_2$. If $d_1 > d_2$, maintain exchanged orders between the points. $x_{i+1}$ and $x_j$ may be a same data point or different data points.

In a possible implementation, in a process in which the encoder side device performs TSP-based path planning in the point cloud data, the encoder side device may insert a new data point in the point cloud data or the encoding queue (for example, insert a data point belonging to another point cloud data in a current point cloud data, or insert a new data point in the encoding queue).

In a possible implementation, in the process of TSP-based path planning, the encoder side device may also delete a data point in the point cloud data or the encoding queue. For example, when a data point of the current point cloud data is added to another point cloud data, the data point may be deleted from the current point cloud data.

That is, in the solution shown in this application, in a queue adding stage in the process of encoding, an encoder may additionally add a data point, or delete an existed data point, so that the freedom and flexibility in the process of encoding can be improved.

Step 705. The encoder side device sequentially encodes the data points according to the orders of the data points in the encoding queue, to obtain the encoded point cloud data corresponding to the point cloud data.

In a possible implementation, the sequentially encoding the data points according to the orders of the data points in the encoding queue includes:

performing, in response to meeting a sorting end condition, the operation of sequentially encoding the data points according to orders of the data points in the encoding queue, where the end condition includes:

there being no data point not added to the encoding queue in the point cloud data;

or a sum of distances among the data points in the encoding queue reaching a designated threshold.

In this embodiment of this application, in the process of performing adding on the encoding queue, if it is determined that an end rule is true, the encoder side device may output the encoding queue, and perform subsequent encoding. The end rule may include, but is not limited to, the following methods:

When U=0 and all points are traversed, end sorting.

When a sum of distance measures of all points in V is greater than a set threshold, end sorting.

When the sum of the distance measures of all points in V cannot be optimized, end sorting.

In a possible implementation, the sequentially encoding the data points according to the orders of the data points in the encoding queue includes:

obtaining, for any first data point and second data point that are adjacent in the encoding queue, a residual signal between the first data point and the second data point.

The residual signal includes at least one of a geometric residual and an attribute residual of the corresponding data points.

In the solution shown in this embodiment of this application, the encoder side device may encode the point cloud data by calculating a predicted residual. That is, according to settings of different conditions, when the sorting is ended, a process of calculating the residual is as follows. Set a point $x_i$ in a previous order as a reference point, and set a residual corresponding to a point $x_{i+1}$ in next order as $r_i = x_{i+1} - x_i$. The obtained residual may be encoded by a commonly used entropy encoder. For example, after the residual is quantized, entropy encoding is performed by the entropy encoder, to output a geometric bitstream and/or attribute bitstream corresponding to the encoded point cloud data.

Step 706. The decoder side device obtains the encoded point cloud data corresponding to the point cloud data.

In this embodiment of this application, for the point cloud data, the encoded point cloud data obtained by encoding in the above steps is transmitted to the decoder side device.

Step 707. The decoder side device obtains reference information, the reference information being used for indicating a start reference data point of an encoding queue.

In a possible implementation, the obtaining reference information includes:

obtaining the default reference information;

parsing stream header information of the encoded point cloud data, to obtain the reference information;

obtaining the reference information based on a data point division manner of the point cloud data; or parsing layer information of the data points in the point cloud data, to obtain the reference information.

In this embodiment of this application, before decoding, the decoder side device may obtain the reference information, for example, when an example of using a first data point in the encoding queue as a start reference data point in the above process of encoding is used, determination of a start location information $\widehat{x_1}$ selected by the TSP includes, but is not limited to, the following situations.

1) Parse the corresponding start location information as a default value.

2) Parse stream header information of point clouds, so that only one piece of start location information is obtained.

3) Parse an octree or perform other division manners to use a current node of the octree as the start location information, so that there may be one or more pieces of start location information.

4) Parse LoD header information to obtain the start location information, so that there may be one or more pieces of start location information.

Step 708. The decoder side device sequentially decodes, based on the reference information and the encoded point cloud data, the data points according to the orders of the data points in the encoding queue.

After obtaining the encoded point cloud data, the decoder side device obtains the reference information and the residual signal through parsing, and sequentially decodes and reconstructs the data points in the encoding queue by using a data point indicated by a reference signal as an initial reference data point corresponding to the encoding queue and by starting from the initial reference data point and using location information and attribute information of the initial reference data point as reference values. Each time one data point is reconstructed by using a previous reconstructed data point as a reference and with reference to a corresponding residual signal.

In this embodiment of this application, the decoder side device may parse the encoded point cloud data, to obtain a residual signal $\{R|r_i \in R^n, i=1, \ldots, N-1\}$. A decoding target is to obtain a reconstructed signal $\{\hat{X}| \hat{x}_i \in R^n, i=1, \ldots, N\}$, where n is a dimension of the signal (assuming that a dimension of geometric information is 3 and a dimension of attribute information is 3), and N is a number of signals. The decoding target may be processed according to the following manners.

When the geometric information or the attribute information is predicted alone, that is, n=3, the reconstructed signal is a sum of a previous signal and a corresponding residual signal in a TSP-optimized order based on a decoded initial signal $\widehat{x_1}$, that is, $\{\hat{X}| \widehat{x_{i+1}} = \hat{x}_i + r_i, i=1, \ldots, N-1\}$.

When the geometric information and the attribute information are simultaneously predicted, that is, n=6, the reconstructed signal is a sum of a previous signal and a corresponding residual signal based on the decoded initial signal $\widehat{x_1}$, that is, $\{\hat{X}| \widehat{x_{i+1}} = \hat{x}_i + r_i, i=1, \ldots, N-1\}$.

In summary, in the solution shown in this embodiment of this application, after data points are sorted according to distances between the data points in point cloud data and a data point in an encoding queue, an encoder side device sequentially encodes the data points according to a sorting order, so that data points that are near in the point cloud data can be sequentially encoded. Correspondingly, a decoder side device only needs to combine reference information and residual signals of the data points to reconstruct the point cloud data, so that the encoding and decoding accuracy can be ensured, and the encoding and decoding complexity can be obviously reduced, thereby improving the encoding and decoding efficiency.

The steps of the solution shown in this application can be used in combination, or used separately. In the solution shown in the above embodiment of this application, a point cloud information prediction method is provided by sorting data points in a point cloud and performing residual encoding according to orders, which can be used for prediction of geometric information and attribute information of point cloud data. The above encoding solution may be implemented independently of the conventional octree-based encoding mode.

Figure 8:
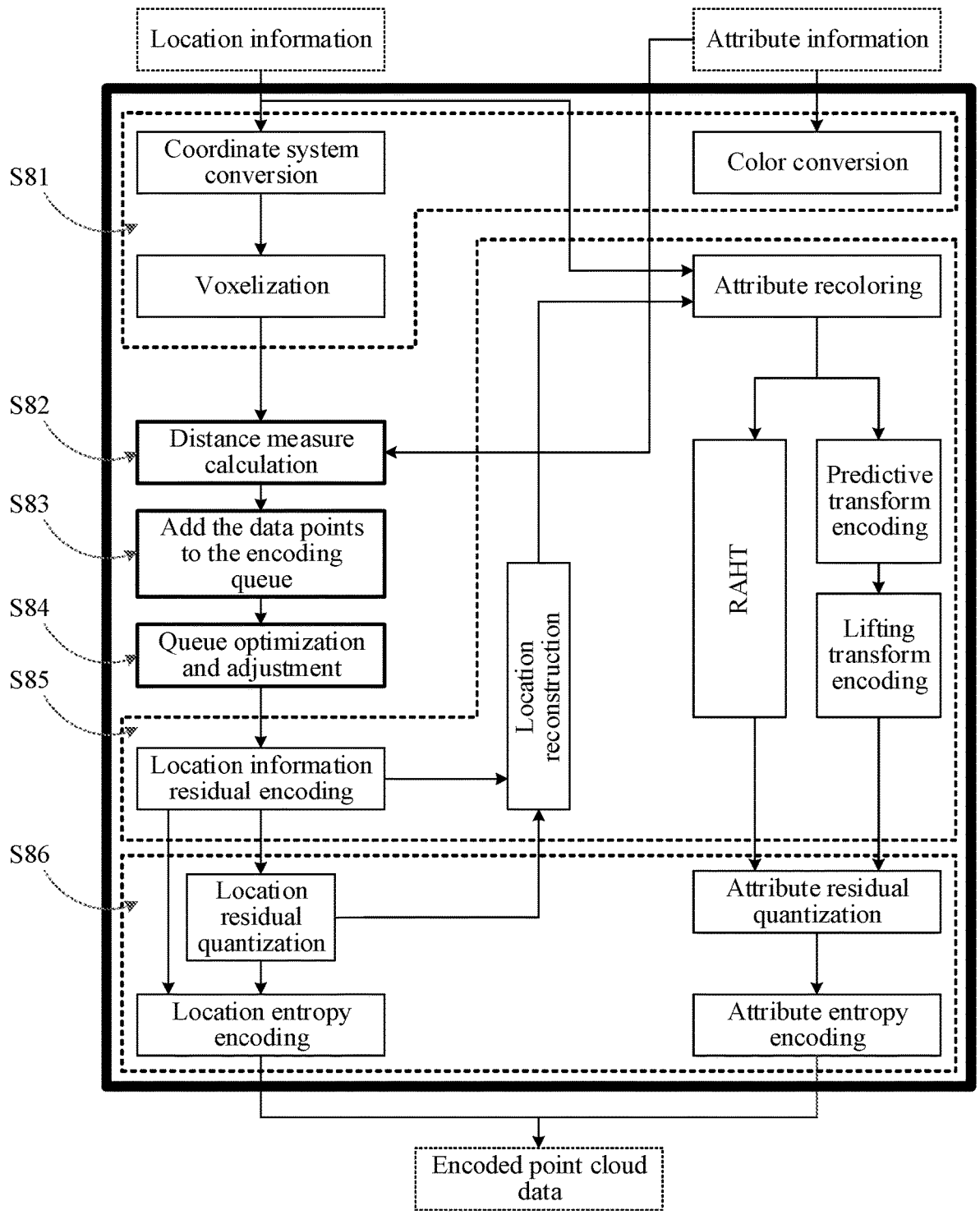
FIG. 8 is a block diagram of a point cloud data encoding procedure according to an embodiment of this application.

By using an example in which the solution shown in the above embodiment of this application is applied to the process of encoding, FIG. 8 is a block diagram of a point cloud data encoding procedure according to an embodiment of this application. As shown in FIG. 8, an exemplary encoding procedure involved in the above embodiment of this application may include the following main steps.

S81. Perform pre-processing on data points in a point cloud data.

An encoder may perform pre-processing (including coordinate system conversion and voxelization) on location information of the data points in the point cloud data.

Optionally, the encoder may also perform pre-processing on attribute information of the data points in the point cloud data, for example, perform color conversion on the data points in the point cloud data.

S82. Perform distance measure calculation on the pre-processed data points in the point cloud data, to obtain distance information between the data points in pairs.

The distance information between the data points in pairs may be location distances, attribute distances, or joint distances of locations and attributes.

S83. Sequentially add the data points in the point cloud data to an encoding queue according to the distance information between the data points in pairs.

In this embodiment of this application, according to the distance information between the data points in pairs, the encoder may start from one or more initial data points, and sequentially add data points in the point cloud data that are closest to some or all of data points in the encoding queue to a tail of the encoding queue, until an end condition is met.

For a process in which the encoder sequentially adds the data points in the point cloud data that are closest to some or all of data points in the encoding queue to the tail of the encoding queue, reference may be made to the related steps in the embodiment of FIG. 5. Details are not described herein again.

S84. Optimize and adjust orders of the data points in the encoding queue.

In a process of constructing the encoding queue or after constructing the encoding queue, the encoder may adjust the orders of the data points in the encoding queue based on distances between each group of adjacent point pairs in the encoding queue, so as to further improve the subsequent encoding effect.

S85. Sequentially perform residual encoding according to the sorting orders of the data points in the encoding queue, to obtain residual signals of the data points.

The sequentially performing residual encoding according to the sorting orders of the data points in the encoding queue may include respectively performing residual encoding on location information and attribute information of the data points, where the residual encoding of the attribute information may include: performing location reconstruction and attribute re-coloring based on residual signals corresponding to the location information or quantized residual information, and performing residual encoding of attribute information according to results of location reconstruction and attribute re-coloring. For example, residual encoding is performed on the attribute information by predictive transform encoding, lifting transform encoding, or RAHT transform encoding, to obtain residual signals of the attribute information.

S86. Perform quantization and entropy encoding on the residual signals, to output encoded point cloud data.

After the encoder respectively performs quantization and entropy encoding on residual encoding of the location information and residual encoding of the attribute information of the data points, the encoded point cloud data may be outputted.

On a decoding side, a decoder only needs to parse the obtained encoded point cloud data to obtain a reference signal, to obtain a first data point in the encoding queue, and sequentially reconstructs, based on a location residual and an attribute residual of the first data point, the data points in the encoding queue according to an inverse process of S85 and S86.

The following is an apparatus embodiment of this application, which can be used to perform the method embodiments of this application. For details not disclosed in the apparatus embodiments of this application, refer to the method embodiments of this application.

Figure 9:
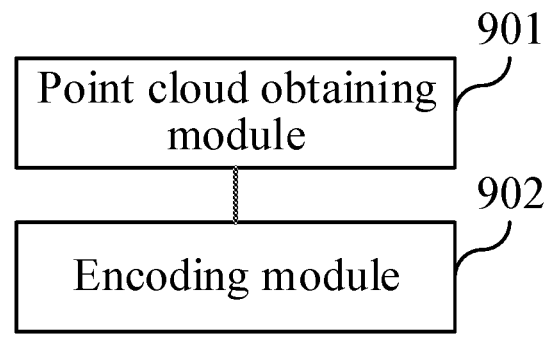
FIG. 9 is a block diagram of a point cloud data encoding apparatus according to an embodiment of this application.

FIG. 9 is a block diagram of a point cloud data encoding apparatus according to an embodiment of this application. The apparatus has a function of implementing the method examples. The apparatus may include:

a point cloud obtaining module 901, configured to obtain a point cloud data, the point cloud data including at least two data points; and an encoding module 902, configured to sequentially encode the data points according to encoding orders of the data points, to obtain encoded point cloud data corresponding to the point cloud data, the encoding orders of the data points being determined based on distances among the data points.

In a possible implementation, the apparatus further includes:

a queue adding module, configured to sequentially add the data points in the point cloud data to an encoding queue based on a distance between a data point pair before the encoding module 902 sequentially encodes the data points according to the encoding orders of the data points, to obtain the encoded point cloud data corresponding to the point cloud data, where the data point pair is a data point pair formed by a data point in the encoding queue and a data point in the point cloud data; and the encoding module 902 is configured to sequentially encode the data points according to orders of the data points in the encoding queue, to obtain the encoded point cloud data corresponding to the point cloud data.

In a possible implementation, the distance between the data point pair includes:

a distance between location information of the two data points in the data point pair; or a distance between attribute information of the two data points in the data point pair; or a joint distance obtained through the distance between the location information of the two data points and the distance between the attribute information of the two data points in the data point pair.

In a possible implementation, the queue adding module is configured to:

sequentially select, based on the distance between the data point in the encoding queue and the data point in the point cloud data, data points meeting a designated condition from the point cloud data, and add the data points to the encoding queue.

In a possible implementation, the designated condition includes:

distances between the data points and a last data point in the encoding queue being the smallest;

or a sum of distances between the data points and the data point in the encoding queue being the smallest.

In a possible implementation, the apparatus further includes:

an initial data point determining module, configured to determine an initial data point from the point cloud data in response to the encoding queue being empty before the queue adding module sequentially adds the data points in the point cloud data to the encoding queue based on the distance between the data point pair; and an initial data point adding module, configured to add the initial data point to the encoding queue.

In a possible implementation, the initial data point determining module is configured to:

randomly select a data point from the point cloud data as the initial data point;

determine the initial data point from the point cloud data based on geometric features of the data points included in the point cloud data;

determine the initial data point from the point cloud data based on statistical features of the data points included in the point cloud data; or determine the initial data point from the point cloud data in response to a data point division manner of the point cloud data.

In a possible implementation, the apparatus further includes:

a queue adjustment module, configured to adjust the orders of the data points in the encoding queue based on distances between adjacent data points in the encoding queue before the encoding module 902 sequentially encodes the data points according to the orders of the data points in the encoding queue.

In a possible implementation, the queue adjustment module is configured to:

obtain a sum of a first distance and a second distance, where the first distance is a distance between an $i^{th}$ data point and an $(i+1)^{th}$ data point in the encoding queue; the second distance is a distance between a $i^{th}$ data point and a $(j+1)^{th}$ data point in the encoding queue; and i and j are integers greater than or equal to 1, and i≠j;

obtain a sum of a third distance and a fourth distance, where the third distance is a distance between the $i^{th}$ data point and the $(j+1)^{th}$ data point, and the fourth distance is a distance between the $(i+1)^{th}$ data point and the $j^{th}$ data point; and exchange locations of the $(i+1)^{th}$ data point and the $(j+1)^{th}$ data point in the encoding queue in response to the sum of the first distance and the second distance being greater than the sum of the third distance and the fourth distance.

In a possible implementation, the encoding module 902 is configured to perform, in response to meeting a sorting end condition, the operation of sequentially encoding the data points according to orders of the data points in the encoding queue, where the end condition includes:

there being no data point not added to the encoding queue in the point cloud data;

or a sum of distances among the data points in the encoding queue reaching a designated threshold.

In summary, in the solution shown in this embodiment of this application, after data points are sorted according to distances among the data points in point cloud data, an encoder side device sequentially encodes the data points according to a sorting order, so that data points that are near in the point cloud data can be sequentially encoded. Correspondingly, a decoder side device only needs to combine reference information and residual signals of the data points to reconstruct the point cloud data, so that the encoding and decoding accuracy can be ensured, and the encoding and decoding complexity can be obviously reduced, thereby improving the encoding and decoding efficiency.

Figure 10:
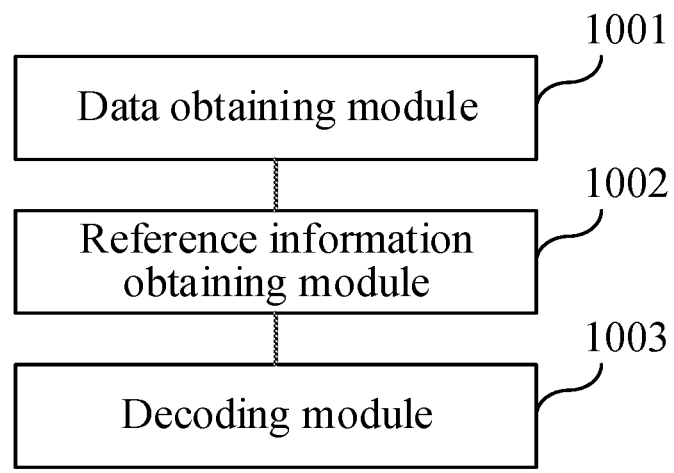
FIG. 10 is a block diagram of a point cloud data decoding apparatus according to an embodiment of this application.

FIG. 10 is a block diagram of a point cloud data decoding apparatus according to an embodiment of this application.

The apparatus has a function of implementing the method examples. The apparatus may include:

a data obtaining module 1001, configured to obtain encoded point cloud data corresponding to a point cloud data, the encoded point cloud data being obtained by an encoding device by sequentially encoding data points based on encoding orders of the data points in the point cloud data; and the encoding orders of the data points being determined based on distances among the data points;

a reference information obtaining module 1002, configured to obtain reference information, the reference information being used for indicating a start reference data point of an encoding queue; and a decoding module 1003, configured to sequentially decode, based on the reference information and the encoded point cloud data, the data points according to the encoding orders of the data points.

In a possible implementation, the encoded point cloud data is obtained by the encoding device by sequentially adding the data points to the encoding queue based on a distance between a data point pair and sequentially encoding the data points according to orders of the data points in the encoding queue; and the data point pair is a data point pair formed by a data point in the encoding queue and a data point in the point cloud data; and the decoding module 1003 is configured to sequentially decode, based on the reference information and the encoded point cloud data, the data points according to the orders of the data points in the encoding queue.

In a possible implementation, the reference information obtaining module 1002 is configured to:

obtain the default reference information;

parse stream header information of the encoded point cloud data, to obtain the reference information;

obtain the reference information based on a data point division manner of the point cloud data; or parse layer information of the data points in the point cloud data, to obtain the reference information.

In summary, in the solution shown in this embodiment of this application, after data points are sorted according to distances among the data points in point cloud data, an encoder side device sequentially encodes the data points according to a sorting order, so that data points that are near in the point cloud data can be sequentially encoded. Correspondingly, a decoder side device only needs to combine reference information and residual signals of the data points to reconstruct the point cloud data, so that the encoding and decoding accuracy can be ensured, and the encoding and decoding complexity can be obviously reduced, thereby improving the encoding and decoding efficiency.

Figure 11:
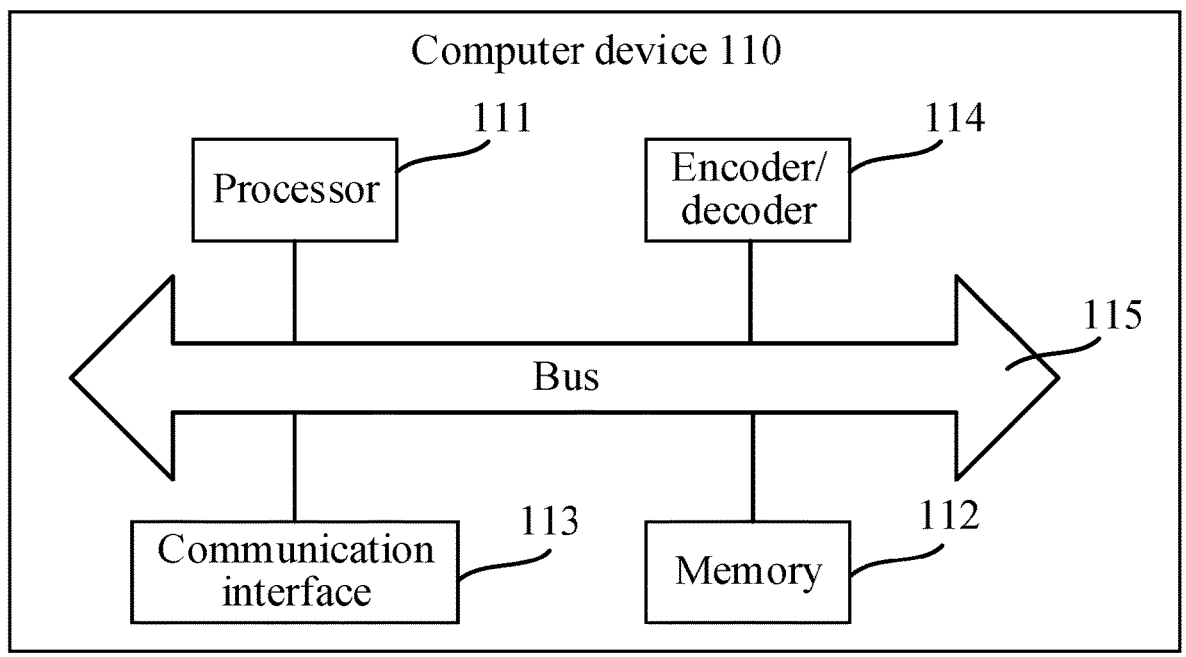
FIG. 11 is a structural block diagram of a computer device according to an embodiment of this application.

FIG. 11 is a structural block diagram of a computer device according to an embodiment of this application. The computer device may be the encoder side device described above, or may be the decoder side device described above. The computer device 110 may include a processor 111, a memory 112, a communication interface 113, an encoder/decoder 114, and a bus 115.

The processor 111 includes one or more processing cores, and the processor 111 performs various functional applications and information processing by running a software program and module.

The memory 112 may be configured to store a computer program. The processor 111 is configured to execute the computer program, to implement all or some steps of the method involved in the above embodiment shown in FIG. 5 or FIG. 6.

The communication interface 113 may be configured to communicate with other devices, for example, receiving/transmitting point cloud data.

The encoder/decoder 114 may be configured to implement encoding and decoding functions, for example, encoding and decoding point cloud data.

The memory 112 is connected to the processor 111 through the bus 115.

In addition, the memory 112 may be implemented by any type of volatile or non-volatile storage device or a combination thereof. The volatile or non-volatile storage device includes, but not limited to: a magnetic disk, an optical disc, an electrically-erasable programmable read-only memory (EEPROM), an erasable programmable read-only memory (EPROM), a static random access memory (SRAM), a read only memory (ROM), a magnetic memory, a flash memory, or a programmable read-only memory (PROM).

A person skilled in the art may understand that the structure shown in FIG. 11 does not constitute any limitation on the computer device 110, and the computer device may include more components or fewer components than those shown in the figure, or some components may be combined, or a different component deployment may be used.

In an exemplary embodiment, a computer-readable storage medium is further provided. The computer-readable storage medium stores at least one computer program, the at least one computer program, when executed by a processor, implementing all or some steps of the method involved in the above embodiment shown in FIG. 5, FIG. 6, FIG. 7, or FIG. 8.

In an exemplary embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform all or some steps of the method involved in the above embodiment shown in FIG. 5, FIG. 6, FIG. 7, or FIG. 8.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

It is to be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are merely examples of the embodiments of this application, but are not intended to limit this application. Any modification, equivalent replacement, or improvement made without departing from the spirit and principle of this application should fall within the protection scope of this application.

What is claimed is:

1. A method for encoding point cloud data, the method comprising:
   obtaining, by a device comprising a memory storing instructions and a processor in communication with the memory, point cloud data, the point cloud data comprising at least two data points;
   sequentially adding the data points in the point cloud data to an encoding queue based on a distance between a data point pair comprising a data point in the encoding queue and a data point in the point cloud data; and
   sequentially encoding, by the device, data points in the point cloud data according to encoding orders of the data points, to obtain encoded point cloud data corresponding to the point cloud data, wherein the encoding orders of the data points being determined based on distances among the data points.

2. The method according to claim 1, wherein:
   the sequentially encoding of the data points according to the encoding orders of the data points, to obtain the encoded point cloud data corresponding to the point cloud data comprises:
      sequentially encoding the data points according to orders of the data points in the encoding queue, to obtain the encoded point cloud data corresponding to the point cloud data.

3. The method according to claim 2, wherein the sequentially encoding of the data points according to orders of the data points in the encoding queue, to obtain the encoded point cloud data corresponding to the point cloud data comprises:
   obtaining, for any first data point and second data point that are adjacent in the encoding queue, a residual signal between the first data point and the second data point.

4. The method according to claim 2, wherein before the sequentially encoding of the data points according to the orders of the data points in the encoding queue, the method further comprises:
   adjusting the orders of the data points in the encoding queue based on distances between adjacent data points in the encoding queue.

5. The method according to claim 1, wherein the distance between the data point pair comprises one of the following:
   a distance between location information of the two data points in the data point pair;
   a distance between attribute information of the two data points in the data point pair; or
   a joint distance obtained through the distance between the location information of the two data points and the distance between the attribute information of the two data points in the data point pair.

6. The method according to claim 1, wherein sequentially adding the data points in the point cloud data to the encoding queue based on the distance between the data point pair comprises:
   sequentially selecting, based on the distance between the data point in the encoding queue and the data point in the point cloud data, data points meeting a designated condition from the point cloud data; and
   adding the selected data points to the encoding queue, wherein the designated condition comprises distances between the data points and a last data point in the encoding queue being the smallest, or a sum of distances between the data points and the data point in the encoding queue being the smallest.

7. The method according to claim 1, wherein before sequentially adding the data points in the point cloud data to the encoding queue based on the distance between the data point pair, the method further comprises:
   in response to the encoding queue being empty:
      determining an initial data point from the point cloud data; and
      adding the initial data point to the encoding queue.

8. A non-transitory computer-readable storage medium, storing computer-readable instructions, wherein, the computer-readable instructions, when executed by a processor, are configured to cause the processor to perform the encoding point cloud data method according to claim 1.
   computer device, comprising a processor and a memory, the memory storing at least one computer program, the at least one computer program is loaded and executed by the processor, to cause the computer device to implement the transaction processing method according to claim 1.

9. An apparatus for encoding point cloud data, the apparatus comprising:
   a memory storing instructions; and
   a processor in communication with the memory, wherein, when the processor executes the instructions, the processor is configured to cause the apparatus to perform:
      obtaining point cloud data, the point cloud data comprising at least two data points;
      sequentially adding the data points in the point cloud data to an encoding queue based on a distance between a data point pair between a data point in the encoding queue and a data point in the point cloud data; and
      sequentially encoding data points in the point cloud data according to encoding orders of the data points, to obtain encoded point cloud data corresponding to the point cloud data, wherein the encoding orders of the data points being determined based on distances among the data points.

10. The apparatus according to claim 9, wherein:
    when the processor is configured to cause the apparatus to perform sequentially encoding the data points according to the encoding orders of the data points, to obtain the encoded point cloud data corresponding to the point cloud data, the processor is configured to cause the apparatus to perform:
    sequentially encoding the data points according to orders of the data points in the encoding queue, to obtain the encoded point cloud data corresponding to the point cloud data.

11. The apparatus according to claim 10, wherein, when the processor is configured to cause the apparatus to perform sequentially encoding the data points according to the orders of the data points in the encoding queue, to obtain the encoded point cloud data corresponding to the point cloud data, the processor is configured to cause the apparatus to perform:
    obtaining, for any first data point and second data point that are adjacent in the encoding queue, a residual signal between the first data point and the second data point.

12. The apparatus according to claim 10, wherein, before the processor is configured to cause the apparatus to perform sequentially encoding the data points according to the orders of the data points in the encoding queue, the processor is configured to further cause the apparatus to perform:

adjusting the orders of the data points in the encoding queue based on distances between adjacent data points in the encoding queue.

13. The apparatus according to claim 9, wherein the distance between the data point pair comprises one of the following:
   a distance between location information of the two data points in the data point pair;
   a distance between attribute information of the two data points in the data point pair; or
   a joint distance obtained through the distance between the location information of the two data points and the distance between the attribute information of the two data points in the data point pair.

14. The apparatus according to claim 9, wherein, when the processor is configured to cause the apparatus to perform sequentially adding the data points in the point cloud data to the encoding queue based on the distance between the data point pair, the processor is configured to cause the apparatus to perform:
   sequentially selecting, based on the distance between the data point in the encoding queue and the data point in the point cloud data, data points meeting a designated condition from the point cloud data; and
   adding the selected data points to the encoding queue,
   wherein the designated condition comprises distances between the data points and a last data point in the encoding queue being the smallest, or a sum of distances between the data points and the data point in the encoding queue being the smallest.

15. The apparatus according to claim 9, wherein, before the processor is configured to cause the apparatus to perform sequentially adding the data points in the point cloud data to the encoding queue based on the distance between the data point pair, the processor is configured to further cause the apparatus to perform:
   in response to the encoding queue being empty:
      determining an initial data point from the point cloud data; and
      adding the initial data point to the encoding queue.

16. A point cloud data decoding method, performed by a computer device, the method comprising:
   obtaining encoded point cloud data corresponding to a point cloud data set, the encoded point cloud data being obtained by an encoding device by sequentially adding the data points in the point cloud data to an encoding queue based on a distance between a data point pair between a data point in the encoding queue and a data point in the point cloud data, and by sequentially encoding data points in the point cloud data according to encoding orders of the data points, wherein the encoding orders of the data points being determined based on distances among the data points;
   obtaining a reference information, the reference information being used for indicating a start reference data point of the encoding queue; and
   sequentially decoding, based on the reference information and the encoded point cloud data, the data points according to the encoding orders of the data points.

17. The point cloud data decoding method according to claim 16, wherein, sequentially decoding, based on the reference information and the encoded point cloud data, the data points according to the reverse of the encoding orders of the data points, comprises:
   sequentially decoding, based on the reference information and the encoded point cloud data, the data points according to the orders of the data points in the reverse of the encoding queue.

18. The point cloud data decoding method according to claim 16, wherein obtaining reference information comprises:
   obtaining a default reference information;
   parsing stream header information of the encoded point cloud data, for obtaining the reference information;
   obtaining the reference information based on a data point division manner of the point cloud data set; or
   parsing layer information of the data points in the point cloud data set, for obtaining the reference information.

19. An apparatus for decoding point cloud data, the apparatus comprising:
   a memory storing instructions; and
   a processor in communication with the memory, wherein, when the processor executes the instructions, the processor is configured to cause the apparatus to perform the decoding point cloud data method according to claim 16.

20. A non-transitory computer-readable storage medium, storing computer-readable instructions, wherein, the computer-readable instructions, when executed by a processor, are configured to cause the processor to perform the decoding point cloud data method according to claim 16.

* * * * *